United States Patent
Kumhyr et al.

(10) Patent No.: US 10,686,765 B2
(45) Date of Patent: Jun. 16, 2020

(54) DATA ACCESS LEVELS

(71) Applicant: INTERNATIONAL BUSINESS MACHINES CORPORATION, Armonk, NY (US)

(72) Inventors: David B. Kumhyr, Austin, TX (US); Arnaud A. Mathieu, Austin, TX (US); Maharaj Mukherjee, Poughkeepsie, NY (US); Michael P. Robertson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/490,972

(22) Filed: Apr. 19, 2017

(65) Prior Publication Data

US 2018/0309738 A1 Oct. 25, 2018

(51) Int. Cl.
  *H04L 29/06* (2006.01)
  *G06F 21/62* (2013.01)
  *H04L 9/08* (2006.01)

(52) U.S. Cl.
  CPC ...... *H04L 63/0478* (2013.01); *G06F 21/6218* (2013.01); *H04L 9/088* (2013.01); *H04L 9/0836* (2013.01); *H04L 63/06* (2013.01); *H04L 63/1433* (2013.01)

(58) Field of Classification Search
  None
  See application file for complete search history.

(56) References Cited

U.S. PATENT DOCUMENTS

| | | | |
|---|---|---|---|
| 5,652,795 | A | 7/1997 | Dillon et al. |
| 6,701,528 | B1 | 3/2004 | Arsenault et al. |
| 7,526,643 | B2 | 4/2009 | Stedron et al. |
| 7,660,986 | B1 | 2/2010 | Qiu et al. |

(Continued)

FOREIGN PATENT DOCUMENTS

| CN | 102036231 A | 4/2011 |
|---|---|---|
| DE | 4339460 C1 | 4/1995 |

OTHER PUBLICATIONS

IBM, "List of IBM Patents or Patent Applications Treated as Related (Appendix P)," Apr. 6, 2018, p. 1-2.

(Continued)

*Primary Examiner* — Benjamin E Lanier
(74) *Attorney, Agent, or Firm* — L. Jeffrey Kelly

(57) ABSTRACT

A method, computer system, and a computer program product for securing and accessing a plurality of data levels is provided. The present invention may include gathering, by a network device, data. The present invention may also include encrypting, by a network device, a first section of data within the gathered data with a level 1 encryption key. The present invention may then include encrypting, by a network device, a second section of data within the gathered data with a level 2 encryption key. The present invention may further include transmitting, by a network device, the data to a recipient device. The present invention may also include decrypting, by the recipient device, the second section of data with the level 2 encryption key. The present invention may then include decrypting, by the recipient device, the first section of data with the level 1 encryption key.

20 Claims, 5 Drawing Sheets

(56) References Cited

U.S. PATENT DOCUMENTS

| | | | |
|---|---|---|---|
| 8,811,620 B2* | 8/2014 | Chaves | G06F 21/6218 380/277 |
| 10,303,895 B1 | 5/2019 | Mccluskey et al. | |
| 10,372,930 B2 | 8/2019 | Sharma et al. | |
| 10,445,509 B2 | 10/2019 | Thota et al. | |
| 2001/0027331 A1* | 10/2001 | Thompson | A61N 1/37282 607/60 |
| 2003/0091184 A1* | 5/2003 | Chui | H04K 1/00 380/37 |
| 2005/0039034 A1* | 2/2005 | Doyle | H04L 9/0825 713/193 |
| 2005/0138393 A1* | 6/2005 | Challener | G06F 21/6218 713/186 |
| 2006/0053285 A1* | 3/2006 | Kimmel | H04L 63/0428 713/166 |
| 2006/0282901 A1* | 12/2006 | Li | G06F 21/606 726/26 |
| 2008/0019523 A1* | 1/2008 | Fuse | H04L 9/088 380/256 |
| 2008/0021834 A1* | 1/2008 | Holla | G06F 19/322 705/51 |
| 2008/0040603 A1* | 2/2008 | Stedron | H04L 9/088 713/166 |
| 2009/0307484 A1* | 12/2009 | Zhang | H04W 12/02 713/153 |
| 2009/0323937 A1* | 12/2009 | Teng | H04L 9/0833 380/36 |
| 2011/0103581 A1* | 5/2011 | Yoon | H04L 9/0861 380/44 |
| 2012/0054500 A1* | 3/2012 | Dhuse | G06F 11/1076 713/189 |
| 2013/0091540 A1* | 4/2013 | Chen | H04W 4/21 726/1 |
| 2013/0174216 A1* | 7/2013 | Simske | G06F 21/6209 726/1 |
| 2013/0246799 A1* | 9/2013 | Balinsky | H04L 9/3247 713/176 |
| 2013/0272523 A1* | 10/2013 | McCorkindale | H04N 1/44 380/243 |
| 2014/0164776 A1* | 6/2014 | Hook | H04L 9/14 713/171 |
| 2015/0067330 A1* | 3/2015 | Khan | H04L 9/3013 713/168 |
| 2015/0234986 A1 | 8/2015 | Dantsker et al. | |
| 2015/0379303 A1* | 12/2015 | LaFever | G06F 21/6218 726/28 |
| 2016/0117519 A1* | 4/2016 | Hashii | G06F 21/6218 713/166 |
| 2016/0248809 A1* | 8/2016 | Smith | H04L 63/0435 |
| 2016/0330573 A1* | 11/2016 | Masoud | H04W 4/90 |
| 2016/0359822 A1* | 12/2016 | Rivera | H04L 63/061 |
| 2017/0063532 A1 | 3/2017 | Bhattacharyya et al. | |
| 2017/0302632 A1 | 10/2017 | Davis et al. | |
| 2018/0054447 A1* | 2/2018 | Greevy | H04L 63/123 |
| 2018/0232524 A1 | 8/2018 | Allo et al. | |
| 2019/0014094 A1 | 1/2019 | Le Saint et al. | |

OTHER PUBLICATIONS

Kumhyr et al., "Data Access Levels," Application and Drawings, Filed on Feb. 9, 2018, 32 Pages, U.S. Appl. No. 15/892,546.

Alfalou et al., "Simultaneous Fusion, Compression, and Encryption of Multiple Images," Optics Express, Nov. 21, 2011, p. 24023-24029, vol. 19, No. 24, Optical Society of America.

Bhatt et al., "Adaptive Cryptosystem for Digital Images using Fibonacci Bit-Plane Decomposition," International Journal of Computer Applications, Mar. 2013, p. 32-36, vol. 65, No. 14.

Cisco, "Securing the Internet of Things: A Proposed Framework," Cisco Security Research & Operations, p. 1-9, http://www.cisco.com/c/en/us/about/security-center/secure-iot-proposed-framework.html, Accessed on Mar. 9, 2017.

CSA, "Identity and Access Management for the Internet of Things—Summary Guidance," CSA IoT Working Group, 2016, p. 1-12, Cloud Security Alliance.

Infineon, "Authentication: Controlling Access to Complex Networks," Security for Internet of Things (IoT), p. 1-7, Infineon Technologies, http://www.infineon.com/cms/en/applications/smart-card-and-security/internet-of-things-security/authentication/, Accessed on Mar. 9, 2017.

Mell et al., "The NIST Definition of Cloud Computing," National Institute of Standards and Technology, Sep. 2011, p. 1-3, Special Publication 800-145.

Myrick, "Google aims to get rid of passwords to replace them with 'Trust Scores'," PHANDROID, May 24, 2016, p. 1-2, http://phandroid.com/2016/05/24/google-trust-score-passwords/, Accessed on Mar. 9, 2017.

Renaud, "Automating and Simplifying Agreement and Secrecy Verification using PVS," University of Canterbury Master Thesis, 2001, p. 1-86.

Singaravelu, "End-To-End Security of Information Flow in Web-Based Applications," Georgia Institute of Technology Dissertation, Aug. 2007, p. 1-108.

\* cited by examiner

DATA ACCESS LEVELS

BACKGROUND

The present invention relates generally to the field of computing, and more particularly to data access levels.

Access to information over a network may contain different levels of security. A user who may want to access data over a secure network may need a certain level of security clearance to access the data. Additionally, different levels of secured data may require different levels of encryption. A new methodology for different levels of encryption may benefit from devices playing a dynamic role associated with encrypting, storing multiple encryption keys and decrypting more than one level of secure data.

SUMMARY

Embodiments of the present invention disclose a method, computer system, and a computer program product for data access levels. The present invention may include gathering, by a network device, a plurality of data. The present invention may also include encrypting, by a network device, a first section of data within the gathered plurality of data with a level 1 encryption key. The present invention may then include encrypting, by a network device, a second section of data within the gathered plurality of data with a level 2 encryption key, wherein the encrypted first section of data is encrypted with the level 2 encryption key. The present invention may further include transmitting, by a network device, a combined batch of data to a recipient device, wherein the combined batch of data comprises the encrypted first section of data, the encrypted second section of data, and an unencrypted section of data.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
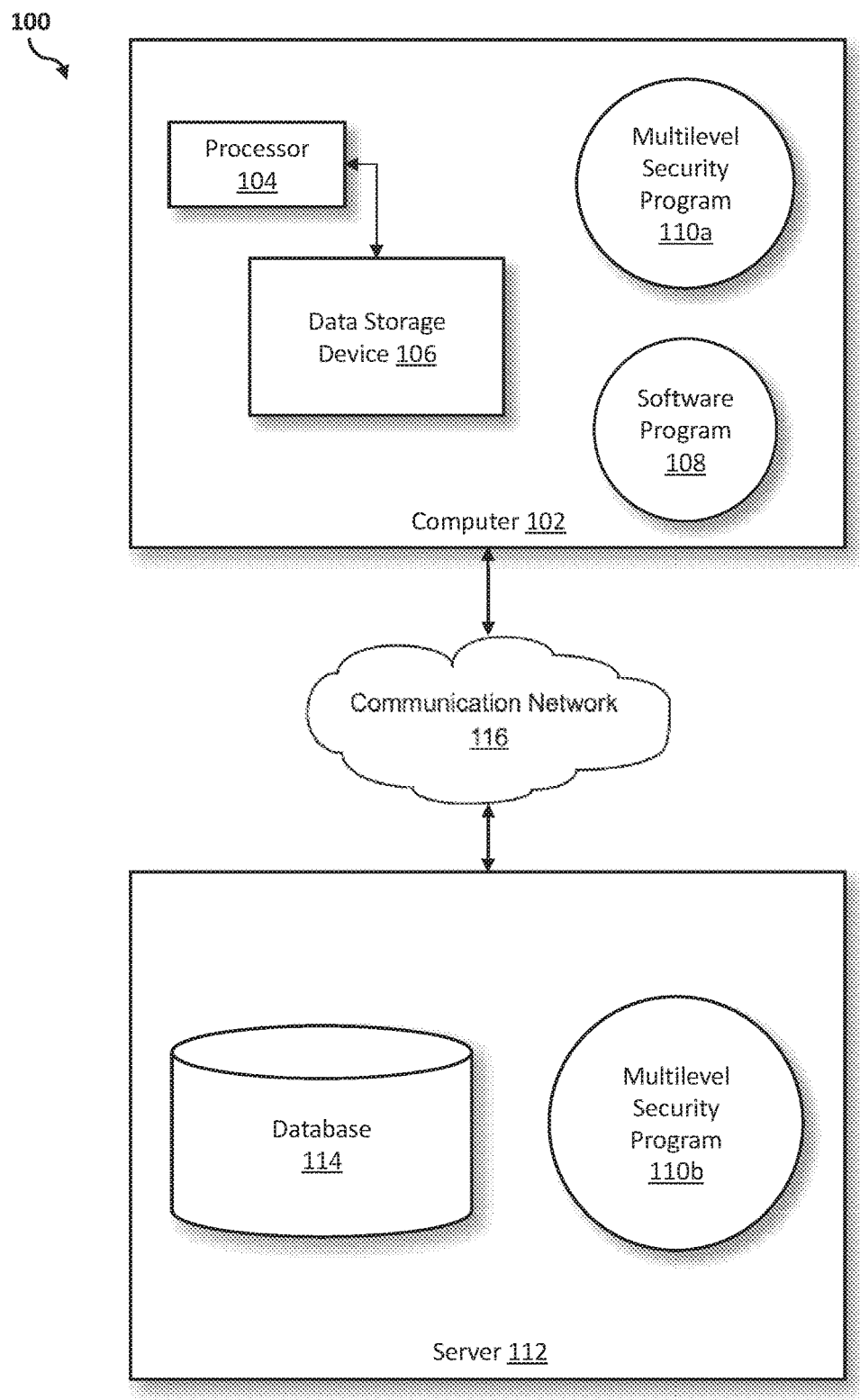
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for multilevel security. As such, the present embodiment has the capacity to improve the technical field of data security by offering multiple levels of encryption (i.e., a plurality of encryption levels) within stored, broadcasted or transmitted data. More specifically, data may be gathered via network devices and the data may then be secured for different levels of access. The level of access may depend on who may have clearance to access the information and which device may have access to encryption keys to decrypt secured data. Clearance level for accessing data may correspond to the encryption keys accessible to a device or a user. Device and access management may be expanded by offering different levels of secure access to data within a batch of data or within a single message. Additionally, a network device may transmit, in a single broadcast, a batch of data with multiple levels of security ranging from the most secure level of data which may be progressively encrypted to the lowest level of security which may be unencrypted.

As described previously, access to information over a network may contain different levels of security. A user who may want to access data over a secure network may need a certain level of security clearance to access the data. Additionally, different levels of secured data may require different levels of encryption. A new methodology for different levels of encryption may benefit from devices playing a dynamic role associated with encrypting, storing multiple encryption keys and decrypting more than one level of secure data.

Security levels may be associated with a user attempting to access secure data and security levels may also be associated with the Internet of Things (IoT) where devices communicate with other devices. IoT may include devices embedded with software, sensors, data storage, central processing units and the ability to connect to a network. An example of IoT may include devices for homes, buildings, vehicles, mobile devices, energy transmission, medical devices, infrastructure and other consumer applications. IoT devices may even communicate with backend infrastructures. Identity and access management for the increased number of devices in communication with other devices may require a dynamic security protocol adaptable for multiple levels of secure access. Access control for so many devices (i.e., things) may also require a more robust encryption and decryption scheme to keep data and access to data secure within a dynamic environment.

Some access control systems may encrypt one batch of data with a single encryption key. Other access control systems may encrypt separate batches of data with separate encryption keys for each batch of data. Each of these access control systems may indicate that each user has access to one batch of data where the data is saved and partitioned in a data repository. Separate batches of encrypted data may require separate encryption keys to access the data. Therefore, it may be advantageous to, among other things, provide an access control system that may create a dynamic approach to multilevel data security by using multiple levels of encryption for a single batch of stored or transmitted data.

According to at least one embodiment, data encryption by a network device may control access to a plurality of data by having more than one level of encryption. Multiple levels of encryption may include more than one encryption key. Multiple levels of encryption may also include highly secured data to be encrypted more than one time, which may require more than one encryption key to access certain levels of secure data. A single device may store one encryption key (i.e., ability to decrypt) or a plurality of encryption keys for a user who may want to access more than one level of secure data. A single IoT device or a plurality of IoT devices may have the ability to access unsecure data or may have the ability store or access encryption keys to decrypt one or more levels of secure data. A multilevel security program may operate on a device and may encrypt a batch of data or may encrypt a single message within a batch of data. The multilevel security program may also include more than one layer of encryption within the batch of data.

Network devices running the multilevel security program may encrypt data with more than one level of security, create encryption keys and store data for either user accessibility or data broadcasts to other devices. IoT devices may send and receive data broadcasts or may access data depending on the level of security that may be accessible to a user device or an IoT device. Different sections of data may have different levels of security. The multilevel security program may encrypt a section of data with the higher level of security first. Then the multilevel security program may encrypt a different section of the data with a lower level of security second. The second encryption may include the encrypted higher level secured data and the lower level secured data which creates two levels of encryption for the higher level secured data and one level of encryption for the lower level secured data. The higher level secured data may have two encryption keys associated with accessing the higher level secured data and the lower level secured data may only require one encryption key to access the lower level secured data. The lowest level of data accessibility in the batch of data may include a section of data that may not be encrypted, may not require an encryption key and may be available to the general public.

The present embodiment may contain three partitioned levels of data, a higher secured level, a lower secured level and an unsecured level where two encryption keys may be needed to access all levels of data (i.e., higher secured level of data, lower secured level of data, and unsecured data). One encryption key may be needed to access two levels of data (i.e., lower secured level of data and unsecured data) and no encryption key may be needed to access the unsecured data. Other embodiments may allow more encryption levels, such as, more than three levels of data secured by more than two encryption keys to access the highest level of secured data.

In addition to encryption levels, device accessibility may include no access levels (i.e., access to unencrypted data only) or one or more access levels (i.e., access to data that has been encrypted) which includes access to both encrypted and unencrypted data (i.e., both secure and unsecure data). With IoT creating many more devices in communication with other devices, multiple devices (i.e., a plurality of devices) may also have access to a range of data from unencrypted data to data with many levels of security. The security level accessible to a device may dictate how much data the device is able to access. Highly sensitive data may require the device to have access to more than one encryption key and non-sensitive data may not require the device to have access to any encryption keys.

The multilevel security program may encrypt data progressively as the level of encryption increases. More sensitive data may require more than one progressive level of encryption to secure the data and may correspondingly require more than one encryption key to decrypt and access the more sensitive data. Progressive encryption encrypts data within already encrypted data (e.g., double encryption for the higher of two levels of encryption). The multilevel security program may allow sensitive data to be encrypted, saved and accessed from a data repository with data that is also available to the general public (i.e., unencrypted data). The multilevel security program may also allow sensitive encrypted data to be broadcasted, in a single broadcast or multiple broadcasts, with unencrypted data. The data available to the general public may have no sensitive data and may require no encryption key. The multilevel security program may create more than two levels of encryption and each higher level may require more than one level of progressive encryption.

Device access may depend on the device's current role in the networked system. Device access may also depend on the security clearance of the user of the device. The device may have more than one role in the network and may have more than one encryption key associated with the device. Additionally, the device role may be a static role, such as one user with one access level, or be dynamic and changing, such as one user with different access levels or multiple users with different access levels. Device access may also be hierarchical when a device has a supervisory role over other devices. The supervisory device may have access to the encryption keys of the other devices it may supervise at any one time. The supervisory roles may also be static roles or dynamic roles.

The multilevel security program may use more than one encryption key for overlapping sections of data instead of requiring a single separate encryption key for each separate section of data. For example, a single message may have two different encryption levels for different data within a single message. Encryption key 1 may secure a part of the message with a higher level of encryption and encryption key 2 may secure a different part of the message with a lower level of encryption. The levels of encryption may be associated with the order of encryption, such as higher levels of secured data may be encrypted before the lower levels of secured data. The timing (i.e., order) of encryption may allow encrypted data to be encrypted more than one time with another encryption key, which may indicate a progressive encryption scheme. The higher level of encryption may encrypt data that requires more security and the lower level of encryption may encrypt data that can be less secure than the higher secured data.

Continuing with the example, the higher level of secured data may be encrypted first with key 1, then the lower level of secured data may be encrypted second with key 2, which may incorporate the encrypted higher level secured data and key 1. The higher level of encryption may require both key 1 and key 2 to access the two encrypted sections of the message. Key 2 may allow access only to the lower level of encrypted data (i.e., the part of the message that was secured by the lower level of encryption) and may not allow access to the higher level of encrypted data (i.e., the part of the message that was secured by the higher level of progressive encryption). Key 1 encrypted data may be encrypted more than one time after the multilevel security program may have encrypted the lower level secured data with key 2. Additional levels of security may be added within the progressive encryption scheme. Progressive encryption (i.e., encrypted data within encrypted data) may create a more data secure environment within a network, therefore, making intrusions by hackers more difficult while allowing different levels of secure data to be broadcasted in a single transmission.

An example of multilevel encryption may include three levels of data with each level associated with a different level of security. Level A, the lowest access level, may be available to the general public and may not be encrypted. Level B, the next access level, may include limited access with one level of encryption. Level C, the highest access level, may include stricter access (e.g., confidential) than limited access with two levels of encryption. Level A may not be encrypted and require no encryption keys to access the unsecured data. Level B may be encrypted one time with one encryption key required to access the secured data. Level C may be encrypted two times requiring two encryption keys to access the secured data.

A jogger, for example, using a software application on a watch that measures and stores data received from sensors, maps and music applications, such as heartrate, location, running pace, music listened to and previous running paths, may have encryption access to the listed data. The user data may have multiple levels of encryption, such as level A, level B, and level C. Level A data may not be encrypted and may be data that the user publicly shares on social media, such as running pace and the recently finished previous running path. Level B data may be the jogger's current heartrate and current location. Level B data may be encrypted and the user (i.e., jogger) may have level B access. Level A data and level B data may be a single batch of data with different levels of security access. Level C access may be more restricted data that the software program administrators may have access to such as backend logs that track and monitor potential security breaches. Level C access data may be encrypted two times, once with level C encryption and then with level B encryption. The user's social media friends may have level A access and may need no encryption key to view what the user has posted online other than accessibility to the social media account. The user may have a level B access (i.e., encryption key able to decrypt level B data) and level A access (i.e., no encryption key necessary) to view data on the software application and to post and view data on social media. Application system administrators may have both level B encryption keys and level C encryption keys to access all data associated with the user and the software application.

Another embodiment may allow encryption keys to include a validity key that may be associated with the role of the device. A validity key may allow a device to change roles where the key associated with a particular role may be usable for a device. In another embodiment, a device may perform multiple roles at the same time and may have access to multiple encryption keys. In this embodiment, a key may be usable based on the relationship to a particular task the device may be performing at one time. In another embodiment, keys may be categorized and grouped in a hierarchical manner and a device may have access to the keys suitable for the hierarchy at which the device resides and any key level lower than the device (e.g., a device holding a supervisory role over one or more other devices).

According to another embodiment, a network device may decide the nature of security risk based on prior history, exchange of data and the trusted nature of the environment. The network device may then create multilevel encryption keys based on the varied level of trust. The multilevel security program may create different levels of encryption keys amongst parties sharing data with a trusted party when the encryption levels are based on the trust between the parties. For example, when data is exchanged within a secured zone, lower levels of encryption may be needed. If data is being exchanged within an unsecured zone, higher levels of encryption between parties may be optimal. Encryption keys are based on the perceived threat of security risk and the encryption keys may include multiple levels of encryption. The multilevel security program may choose the level of encryption for the network device based on the risk, or the perceived risk. For instance, the multilevel security program may choose, based on the level of risk, to either use a strong encryption key when sending data on a public wi-fi system (i.e., perceived as high risk) or a normal encryption key when sending data on an encrypted private network, or a secure sockets layer (SSL) link.

According to another embodiment, the multilevel security program may choose an encryption key based on the functional role of the device encrypting the data. The functional role may differ from the supervisory role. For instance, the functional role may be based on the type of measurement that the device is gathering. The different types of data gathered from a multi sensors device may be encrypted separately where the temperature data may be encrypted with one encryption key and the level of radioactivity may be encrypted with a different encryption key. The encryption levels and roles may be determined based on the function or measurement of the data.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a multilevel security program 110a. The networked computer environment 100 may also include a server 112 that is enabled to run a multilevel security program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114.

According to various implementations of the present embodiment, the multilevel security program 110a, 110b may interact with a database 114 that may be embedded in various storage devices, such as, but not limited to a computer/mobile device 102, a networked server 112, or a cloud storage service.

According to the present embodiment, an individual using a client computer 102 or a server computer 112 may use the multilevel security program 110a, 110b (respectively) to secure data with different levels of encryption. The multilevel security method is explained in more detail below with respect to FIG. 2.

Figure 2:
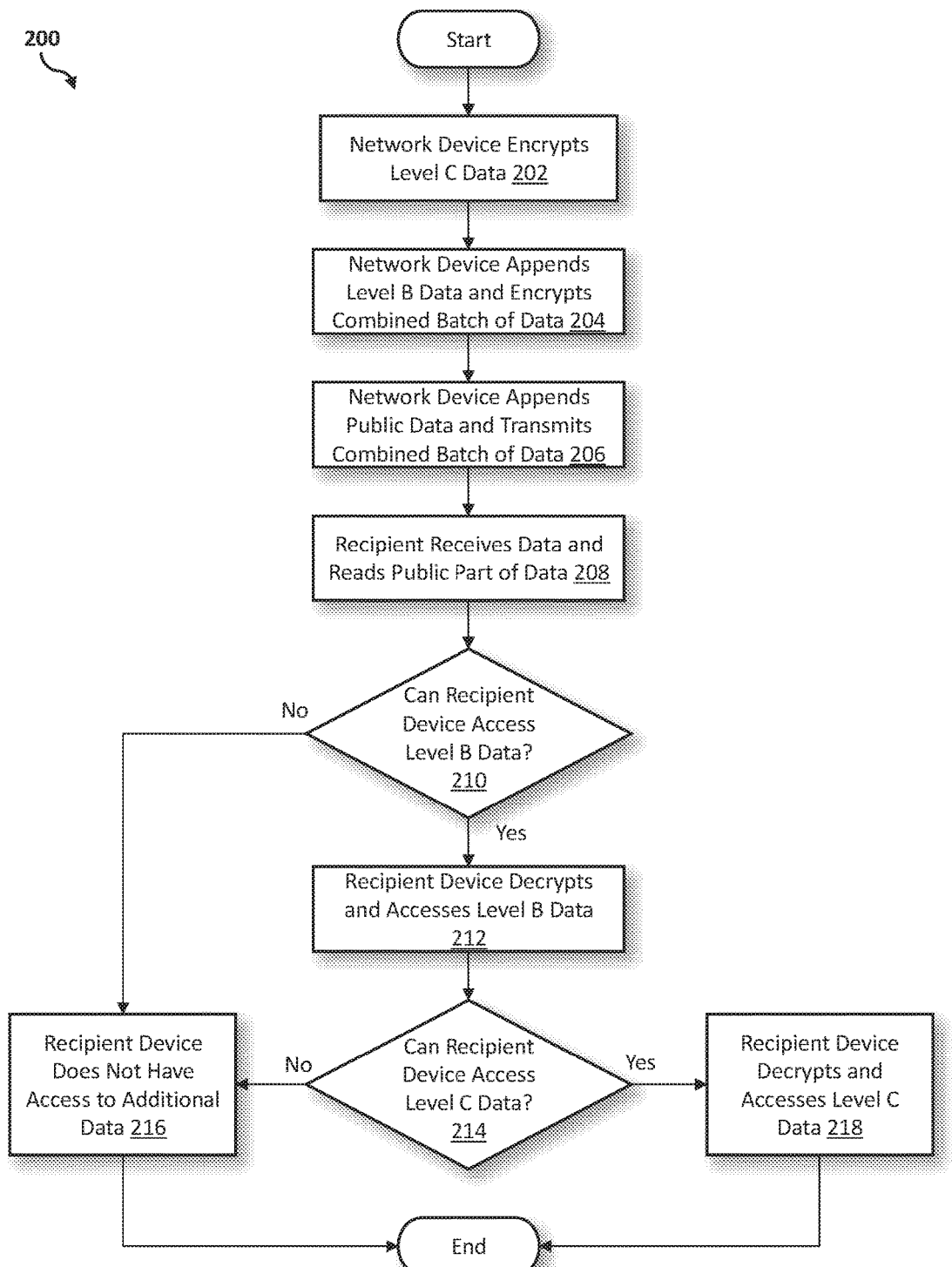
FIG. 2 is an operational flowchart illustrating a process for securing and accessing multiple data levels according to at least one embodiment.

Referring now to FIG. 2, an operational flowchart illustrating the exemplary securing and accessing multiple data levels process 200 used by the multilevel security program 110a, 110b according to at least one embodiment is depicted. Devices depicted in the current embodiment and in other embodiments may communicate with each other device in a communication network 116. Devices that run the multilevel security program 110a, 110b may encrypt data, store data, broadcast data and transmit data. Other devices within a communication network 116 may receive broadcasted data, gather data, access stored data, store encryption keys, access encryption keys stored on another device, and may decrypt multiple data levels (i.e., a plurality of data levels). Devices may include a computer 102, a server 112, mobile phones, watches, tablets, cars or any IoT device. The present embodiment may use the term network device to represent the device that encrypts and either stores or transmits in a single transmission both unencrypted and encrypted data. The present embodiment may use the term recipient device as a device that may store encryption keys and access both unencrypted and encrypted data.

At 202, a network device encrypts level C data. Level C data may represent confidential data and may be the highest level of sensitive data to be encrypted. Once the network device has gathered data from one source or multiple sources (e.g., sensors or multiple IoT devices, or a combination of sensors and multiple IoT devices), the multilevel security program 110a, 110b may secure the confidential data by encrypting the confidential data first. Confidential data may require, for example, encryption key 1 to access the confidential information. The data being encrypted may be a batch of data, a packet of data (i.e., data packet), a small portion of data or a section of a message. A recipient device may access confidential data if the recipient device has access to encryption key 1.

The multilevel security program 110a, 110b encryption may secure more than two levels of encryption. The multiple levels of encryption may use progressive encryption methods including higher levels of encryption embedded within lower levels of encryption. The multilevel security program 110a, 110b may also encrypt more than two levels of encryption with non-progressive encryption methods or with a combination of both progressive and non-progressive encryption methods.

Next at 204, the network device appends level B data and encrypts the combined batch of data. Level B data may represent data with limited accessibility and a lower level of sensitivity than confidential data (i.e., level C data). Data with limited access may be encrypted second, after the confidential data is encrypted, to permit a progressive encryption method. The multilevel security program 110a, 110b may create encryption key 2 to secure the data with limited access. Encryption key 2 may also encrypt the confidential encrypted data associated with encryption key 1 and may be the second encryption key in the chain of encryption keys. Access to multiple progressive encryption keys may allow access to more secure levels of data, therefore, access to the confidential data by a recipient device may require access to both encryption key 1 and encryption key 2.

After encryption key 1 has secured the confidential data (i.e., level C data), the multilevel security program may append the data with limited access (i.e., level B data) to the to the encrypted confidential data (i.e., level C data) into one data packet. Then, the combined data packet (i.e., encrypted level C data and unencrypted level B data) may be encrypted using encryption key 2. The combined batch of data at this phase may include both the confidential encrypted data (i.e., level C encrypted data) and data with limited access (i.e., level B data). Access to both levels of data (i.e., level C data and level B data) may require access to both encryption key 1 and encryption key 2.

Then, at 206, the network appends the public data and transmits the combined batch of data. There may be another section of the data packet (i.e., level A data) that may be available for accessibility to the general public and may not be encrypted. A network device that has encrypted multiple levels of data with progressive encryption keys may transmit, in a single transmission or in multiple transmissions, the whole data packet to a single recipient device or to a plurality of recipient devices. Access to level C encrypted data and level B encrypted data may require access to encryption key 1 and encryption key 2, respectively, while access to the unencrypted data (i.e., level A data) may not require an encryption key. The different encryption keys in the series of encryption keys may depend on the level of sensitivity of the data. The more levels of encryption provided by the network device may have corresponding levels of encryption keys associated with accessibility to the data. As such, the level of access attainable to a recipient device may depend on which level encryption keys are accessible to the recipient device that may decrypt the data.

After appending the confidential encrypted data (i.e., level C encrypted data), which requires key 1 to access, and data with limited access (i.e., level B data), which requires key 2 to access, the multilevel security program 110a, 110b may then append the unencrypted data (i.e., level A data) that may be available to the general public to the combined batch of data. Next, the multilevel security program 110a, 110b, may transmit the multilevel encrypted data with the unencrypted data (i.e., the combined batch of data) to a single recipient device or to a plurality of recipient devices.

At 208, the recipient receives data and reads the public part of the data. If the recipient device does not have access to any encryption keys, nor have any level of security clearance, the recipient device may access the unencrypted data (i.e., level A data) transmitted from the network device. The multilevel security program 110a, 110b may allow the recipient device with no accessibility to encryption keys to access the unencrypted section of the combined batch of data received from the network device.

Next at 210, the multilevel security program 110a, 110b determines if the recipient device can access level B data. If the recipient device has access to encryption key 2, then the recipient device may access both the unencrypted data (i.e., level A data) and the limited access data (i.e., level B data). The multilevel security program 110a, 110b may transmit all levels of encrypted data and the unencrypted data to a single recipient device or a plurality of recipient devices in a single transmission or in multiple transmissions notwithstanding encryption key access. Encryption key availability on a recipient device may allow a device to access the data level associated with a particular encryption key or multiple encryption keys. Each recipient device that receives the transmitted data from the network device may access the unencrypted data (i.e., level A data). Each recipient device that has access to encryption key 2 may access both the limited access data (i.e., level B data) and the unencrypted data (i.e., level A data).

If the multilevel security program 110a, 110b determines the recipient device can access level B data at 210, then the recipient device decrypts and accesses level B data at 212. Encryption key availability on a recipient device may allow a device to access the data level associated with a particular encryption key or multiple encryption keys. Each recipient device that receives the transmitted data from the network device may access the unencrypted data (i.e., level A data). Each recipient device that has access to encryption key 2 may access both the limited access data (i.e., level B data) and the unencrypted data (i.e., level A data). Upon unlocking the limited access data with encryption key 2, the recipient device may have access to all data in the batch of data associated with the unencrypted (i.e., level A) section of data and the key 2 encrypted (i.e., level B) section of data.

Then at 214, the multilevel security program 110a, 110b determines if the recipient device can access level C data. If the recipient device has access to encryption key 1 and encryption key 2, then the recipient device may access the unencrypted data (i.e., level A data), the limited access data (i.e., level B data) and the confidential data (i.e., level C data). The multilevel security program 110a, 110b may transmit all levels of encrypted data and the unencrypted data to a single recipient device or a plurality of recipient devices. Each recipient device that receives the transmitted data from the network device may access the unencrypted data (i.e., level A data). Each recipient device that has access to encryption key 2 may access both the limited access data (i.e., level B data) and the unencrypted data (i.e., level A data). Correspondingly, each recipient device that has access to encryption key 1, may access all three levels of data (i.e., level A data, level B data, and level C data).

If the multilevel security program 110a, 110b determines that the recipient device cannot access level B data at 210, or if the multilevel security program 110a, 110b determines the recipient device cannot access level C data at 214, then the multilevel security program 110a, 110b determines that the recipient device does not have access to additional data at 216. If the recipient device cannot access level B data, then the recipient device may be restricted to access the unencrypted data only. A recipient device that is unable to access level B data may indicate that the recipient device does not have access to the proper encryption keys, therefore, the recipient device may not decrypt any level of data, such as level B data. If the recipient device attempts to access level B data, then the multilevel security program 110a, 110b may prompt the recipient device to provide an encryption key. Additionally, any recipient device may only be able to unlock or access the levels of encrypted data for which the recipient device has the appropriate encryption key required to unlock.

If the recipient device has level B access, but not level C access, the recipient device may be restricted to access the unencrypted data or may be restricted to access of both the unencrypted data (i.e., level A data) and the limited access data (i.e., level B data). A recipient device that is unable to access level C data may indicate that the recipient device has access to either no proper encryption key or to one proper encryption key that is able to access level B data. Therefore, the recipient device may not have the ability to decrypt level C data but the recipient device may decrypt level B data and have access to level A data. If the recipient device attempts to access level C data, then the multilevel security program 110a, 110b may prompt the recipient device to provide an encryption key associated with the security of level C data. Additionally, any recipient device may only be able to unlock or access the levels of encrypted data for which the recipient device has the appropriate encryption key required to unlock.

If the multilevel security program 110a, 110b determines the recipient device can access level C data at 214, then the recipient device decrypts and accesses level C data at 218. A single recipient device or a plurality of recipient devices may access the unencrypted data (i.e., level A data), the limited access data (i.e., level B data) and the confidential data (i.e., level C data). No encryption key may be associated with the transmitted unencrypted data. Encryption key 2 may be associated with the transmitted limited access data (i.e., level B data). Encryption key 1 may be progressively embedded in encryption key 2 and may be associated with the transmitted confidential data (i.e., level C data).

Encryption key availability on a recipient device may allow a device to access the data level associated with a particular encryption key or multiple encryption keys. Each recipient device that receives the transmitted data from the network device may access the unencrypted data (i.e., level A data). Each recipient device that has access to encryption key 2 may access both the limited access data (i.e., level B data) and the unencrypted data (i.e., level A data). Each recipient device that has access to encryption key 1 may access all three levels of data (i.e., level A data, level B data, and level C data). Upon unlocking the limited access data with encryption key 2, then the confidential data with encryption key 1, the recipient device may have access to all data in the transmitted batch of data associated with the unencrypted (i.e., level A) section of data, the key 2 encrypted (i.e., level B) section of data and the progressive key 1 (i.e., level C) section of data.

The series of keys created by the network device for a single recipient device or a plurality of recipient devices may correspond to the number of levels of sensitivity of the transmitted data. The recipient device may unlock or access data based on the sections of data for which the recipient device may have the associated encryption key to unlock. For example, the network device transmits data values A, B, and C, where data value A is associated with data available to the general public. Data value B is associated with limited access data and data value C is associated with confidential data. Two keys are created by the network device. Key 2 is associated with limited access data and key 1 is associated with confidential data. Data value C may be encrypted first with key 1. Next, data value B and encrypted value C may be encrypted with key 2. After encryption, the network device transmits data values A, B, and C to a recipient device or a plurality of recipient devices as unencrypted data value A, key 2 encrypted data value B and key 1 encrypted data value C. Correspondingly, any recipient device may access unencrypted data value A. Only recipient devices with key 2 may decrypt the unencrypted data value A and key 2 encrypted data value B. Finally, only recipient devices with both key 1 and key 2 may be able to decrypt key 1 encrypted data value C.

It may be appreciated that FIG. 2 provides only an illustration of one embodiment and does not imply any limitations with regard to how different embodiments may be implemented. Many modifications to the depicted embodiment(s) may be made based on design and implementation requirements.

Figure 3:
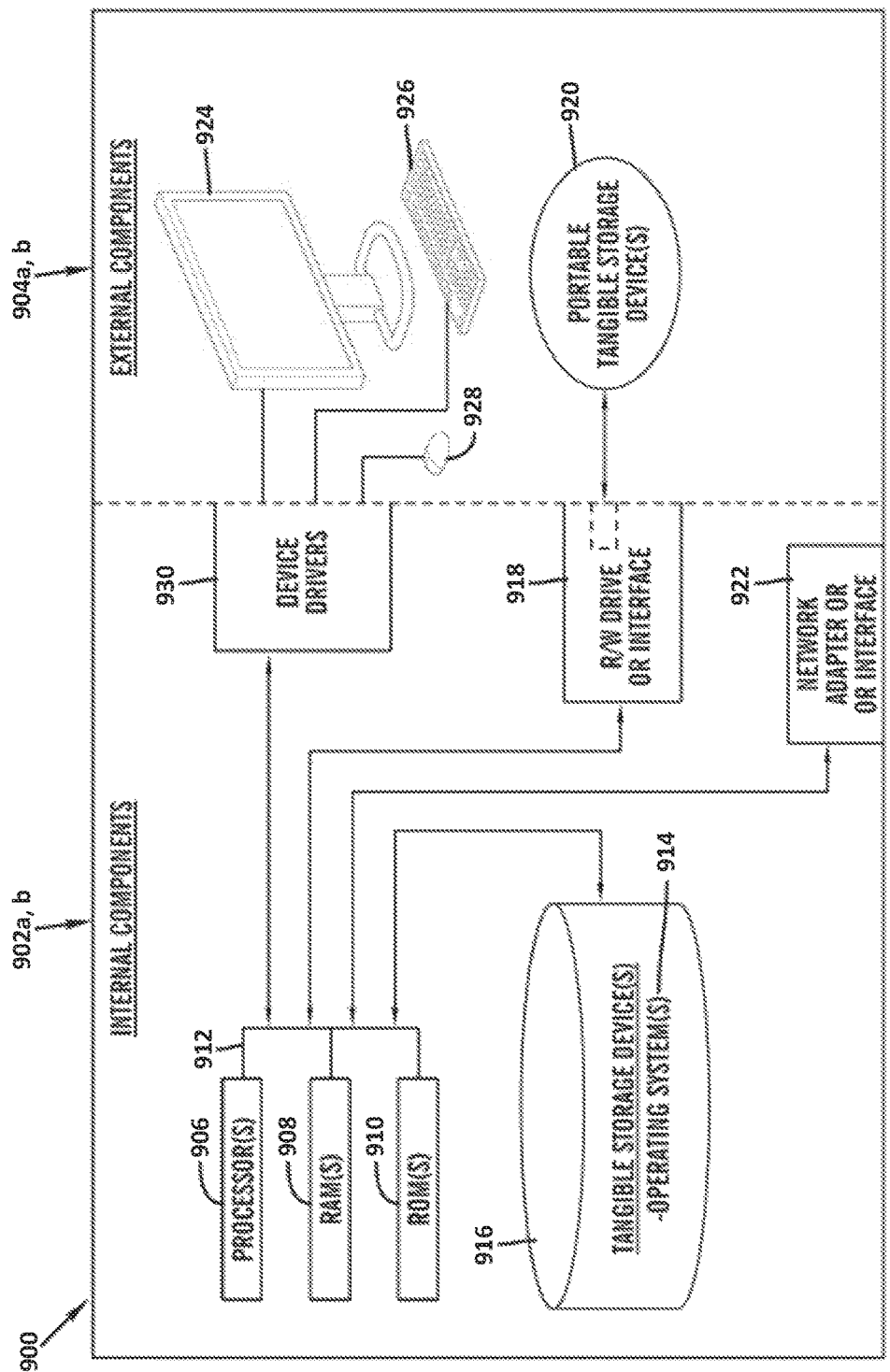
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 3. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the multilevel security program 110a in client computer 102, and the multilevel security program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the multilevel security program 110a, 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the multilevel security program 110a in client computer 102 and the multilevel security program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the multilevel security program 110a in client computer 102 and the multilevel security program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926, and computer mouse 928. The device drivers 930, R/W drive or interface 918, and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
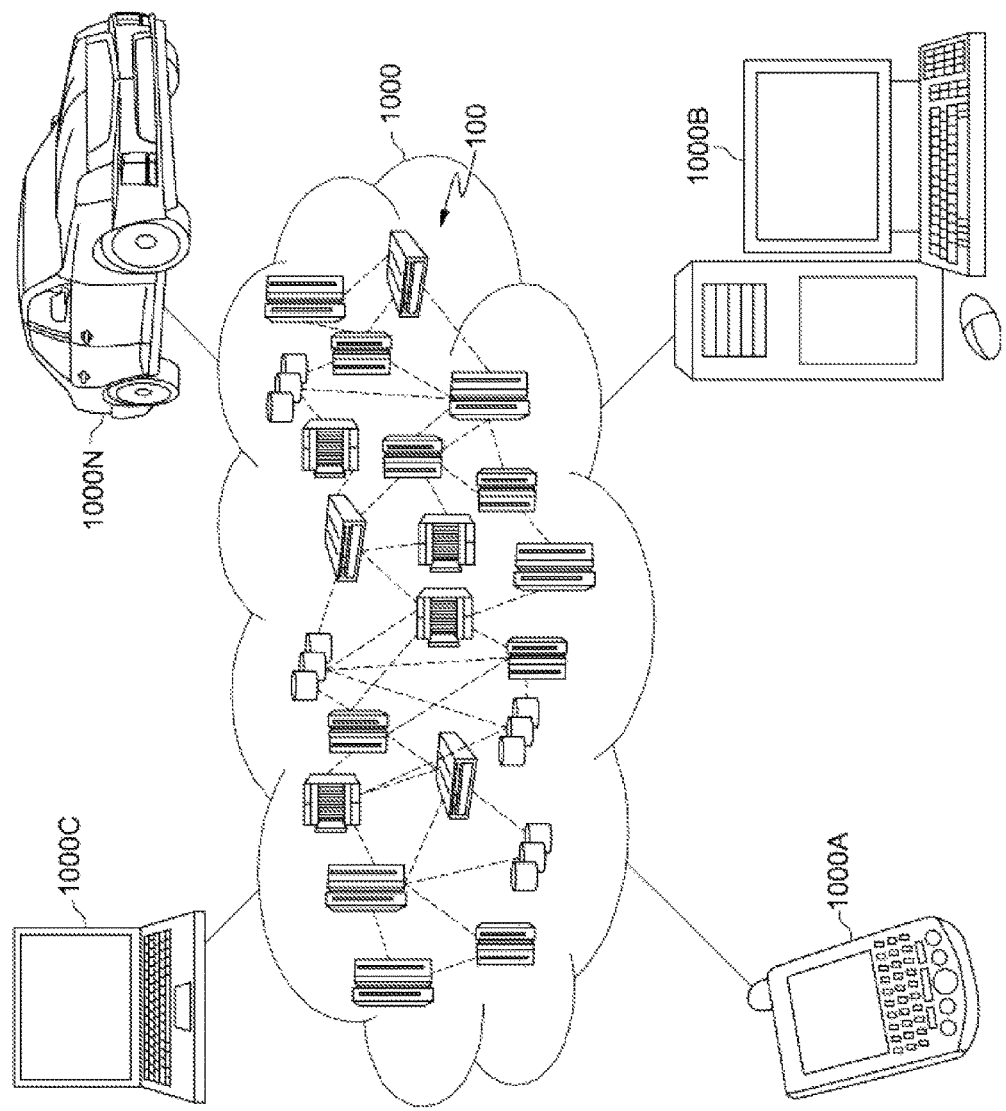
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
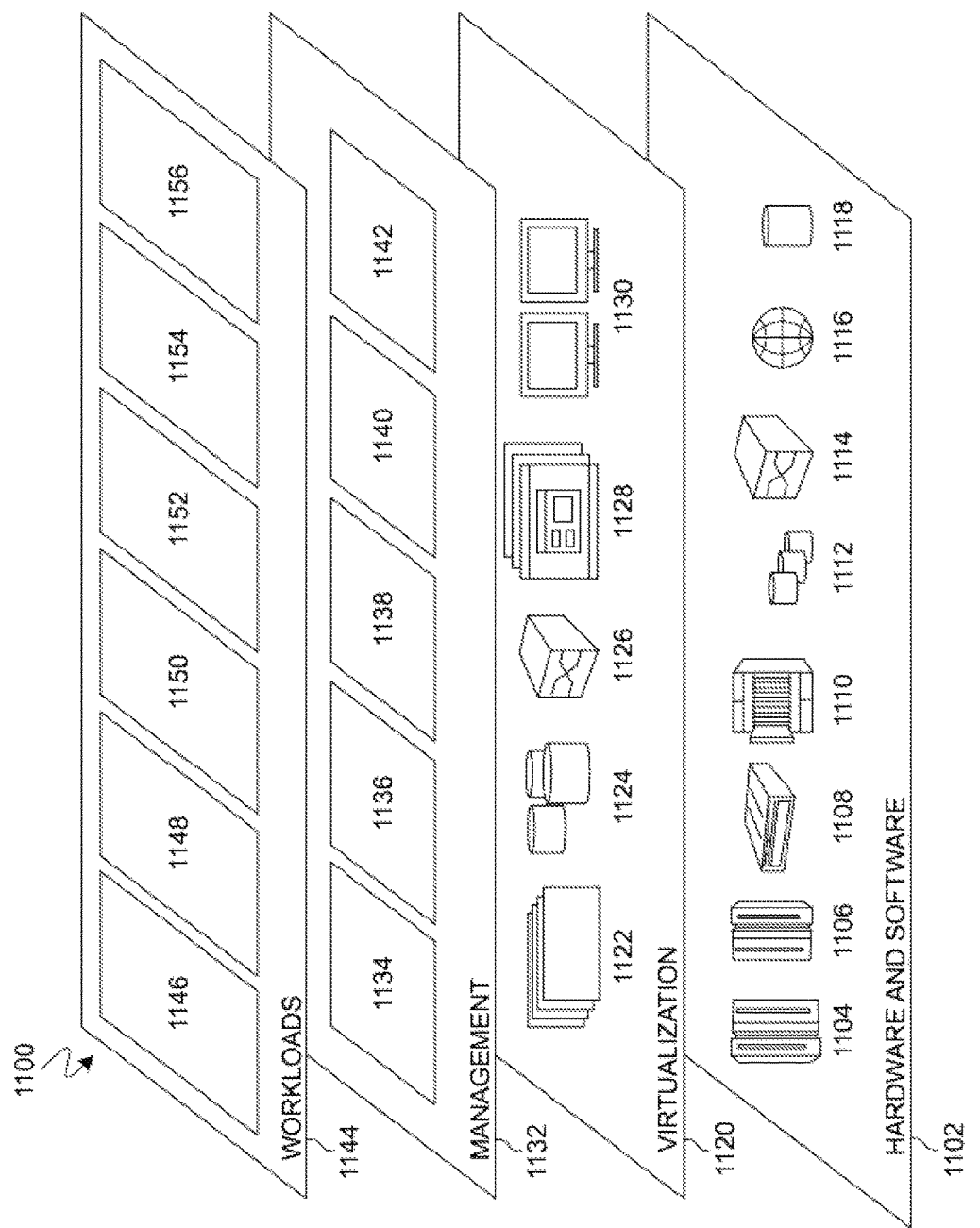
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and multilevel security 1156. A multilevel security program 110a, 110b provides a way to secure and access data levels.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for securing and accessing a plurality of data levels, the method comprising:
   gathering, by a network device, a plurality of data for transmission across an unsecured zone;
   identifying a potential security risk based on the unsecured zone;
   determining to encrypt the plurality of data with more than one level of encryption based on the identified security risk;
   encrypting, by a network device, a first section of data within the gathered plurality of data with a first level encryption key;
   encrypting, by a network device, a second section of data within the gathered plurality of data with a second level encryption key, wherein the first section of data is a progressively encrypted section of data with the first level encryption key and the second level encryption key associated with accessing the first section of data, wherein the first level encryption key and the second level encryption key include a validity key that is associated with one or more roles of a multi-role recipient device, wherein the validity key allows the recipient device to perform multiple roles concurrently; and
   transmitting, in a single transmission across the unsecured zone, a combined batch of data to a plurality of recipient devices and a validity key for the multi-role recipient device, wherein the combined batch of data includes the progressively encrypted first section of data, the encrypted second section of data, and an unencrypted section of data, wherein each of the plurality of recipient devices is configured to access different sections of the combined batch of data in the single transmission and the multi-role recipient device changes roles using the validity key and has access to each section of the combined batch of data.

2. The method of claim 1, further comprising:
   decrypting, by the recipient device, the second section of data with the second level encryption key; and
   decrypting, by the recipient device, the first section of data with the first level encryption key.

3. The method of claim 1, wherein the plurality of data is encrypted with more than two levels of encryption, and wherein the network device transmits data with more than two levels of encryption in a single transmission.

4. The method of claim 1, wherein the encrypted first section of data is associated with the first level encryption key, the encrypted second section of data is associated with the second level encryption key, and wherein the first level encryption key is a progressive encryption key.

5. The method of claim 1, wherein the network device has a hierarchical supervisory role over at least one other device, and wherein the network device has access to the encryption keys of at least one other device.

6. The method of claim 1, wherein the encryption key is chosen based on the role of a device that is encrypting data, wherein the role is a functional role, and wherein the functional role is based on the type of data gathered by the network device.

7. The method of claim 1, wherein an alternative encryption key is chosen based on a risk perceived by the network device sending data, and wherein the network device determines a level of risk.

8. A computer system for securing and accessing a plurality of data levels, comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   gathering, by a network device, a plurality of data for transmission across an unsecured zone;
   identifying a potential security risk based on the unsecured zone;
   determining to encrypt the plurality of data with more than one level of encryption based on the identified security risk;
   encrypting, by a network device, a first section of data within the gathered plurality of data with a first level encryption key;
   encrypting, by a network device, a second section of data within the gathered plurality of data with a second level encryption key, wherein the first section of data is a progressively encrypted section of data with the first level encryption key and the second level encryption key associated with accessing the first section of data, wherein the first level encryption key and the second level encryption key include a validity key that is associated with one or more roles of a multi-role recipient device, wherein the validity key allows the recipient device to perform multiple roles concurrently; and
   transmitting, in a single transmission across the unsecured zone, a combined batch of data to a plurality of recipient devices and a validity key for the multi-role recipient device, wherein the combined batch of data includes the progressively encrypted first section of data, the encrypted second section of data, and an unencrypted section of data, wherein each of the plurality of recipient devices is configured to access different sections of the combined batch of data in the single transmission and the multi-role recipient device changes roles using the validity key and has access to each section of the combined batch of data.

9. The computer system of claim 8, further comprising:
   decrypting, by the recipient device, the second section of data with the second level encryption key; and
   decrypting, by the recipient device, the first section of data with the first level encryption key.

10. The computer system of claim 8, wherein the plurality of data is encrypted with more than two levels of encryption, and wherein the network device transmits data with more than two levels of encryption in a single transmission.

11. The computer system of claim 8, wherein the encrypted first section of data is associated with the first level encryption key, the encrypted second section of data is associated with the second level encryption key, and wherein the first level encryption key is a progressive encryption key.

12. The computer system of claim 8, wherein the network device has a hierarchical supervisory role over at least one other device, and wherein the network device has access to the encryption keys of at least one other device.

13. The computer system of claim 8, wherein the encryption key is chosen based on the role of a device that is encrypting data, wherein the role is a functional role, and wherein the functional role is based on the type of data gathered by the network device.

14. The computer system of claim 8, wherein an alternative encryption key is chosen based on a risk perceived by the network device sending data, and wherein the network device determines a level of risk.

15. A computer program product for securing and accessing a plurality of data levels, comprising:
one or more computer-readable storage medium and program instructions stored on at least one of the one or more tangible storage medium, the program instructions executable by a processor, the program instructions comprising:
program instructions to gather, by a network device, a plurality of data for transmission across an unsecured zone;
program instructions to identify a potential security risk based on the unsecured zone;
program instructions to determine to encrypt the plurality of data with more than one level of encryption based on the identified security risk;
program instructions to encrypt, by a network device, a first section of data within the gathered plurality of data with a first level encryption key;
program instructions to encrypt, by a network device, a second section of data within the gathered plurality of data with a second level encryption key, wherein the first section of data is a progressively encrypted section of data with the first level encryption key and the second level encryption key associated with accessing the first section of data, wherein the first level encryption key and the second level encryption key include a validity key that is associated with one or more roles of a multi-role recipient device, wherein the validity key allows the recipient device to perform multiple roles concurrently; and
program instructions to transmit, in a single transmission across the unsecured zone, a combined batch of data to a plurality of recipient devices and a validity key for the multi-role recipient device, wherein the combined batch of data includes the progressively encrypted first section of data, the encrypted second section of data, and an unencrypted section of data, wherein each of the plurality of recipient devices is configured to access different sections of the combined batch of data in the single transmission and the multi-role recipient device changes roles using the validity key and has access to each section of the combined batch of data.

16. The computer program product of claim 15, further comprising:
program instructions to decrypt, by the recipient device, the second section of data with the second level encryption key; and
program instructions to decrypt, by the recipient device, the first section of data with the first level encryption key.

17. The computer program product of claim 15, wherein the encrypted first section of data is associated with the first level encryption key, the encrypted second section of data is associated with the second level encryption key, and wherein the first level encryption key is a progressive encryption key.

18. The computer program product of claim 15, wherein the network device has a hierarchical supervisory role over at least one other device, and wherein the network device has access to the encryption keys of at least one other device.

19. The computer program product of claim 15, wherein the encryption key is chosen based on the role of a device that is encrypting data, wherein the role is a functional role, and wherein the functional role is based on the type of data gathered by the network device.

20. The computer program product of claim 15, wherein an alternative encryption key is chosen based on a risk perceived by the network device sending data, and wherein the network device determines a level of risk.

* * * * *